C. HENDERSON.

SHEET DELIVERY MECHANISM FOR PRINTING PRESSES.

APPLICATION FILED SEPT. 15, 1911.

Reissued Dec. 5, 1911. 13,336.

3 SHEETS—SHEET 1.

WITNESSES

Alvin H. Kolmes

James B. Bransfield

INVENTOR

Carl Henderson

By: Alexander Sewell

Attorney

COLUMBIA PLANOGRAPH CO., WASHINGTON, D. C

C. HENDERSON.
SHEET DELIVERY MECHANISM FOR PRINTING PRESSES.
APPLICATION FILED SEPT. 15, 1911.
Reissued Dec. 5, 1911. 13,336.
3 SHEETS—SHEET 2.
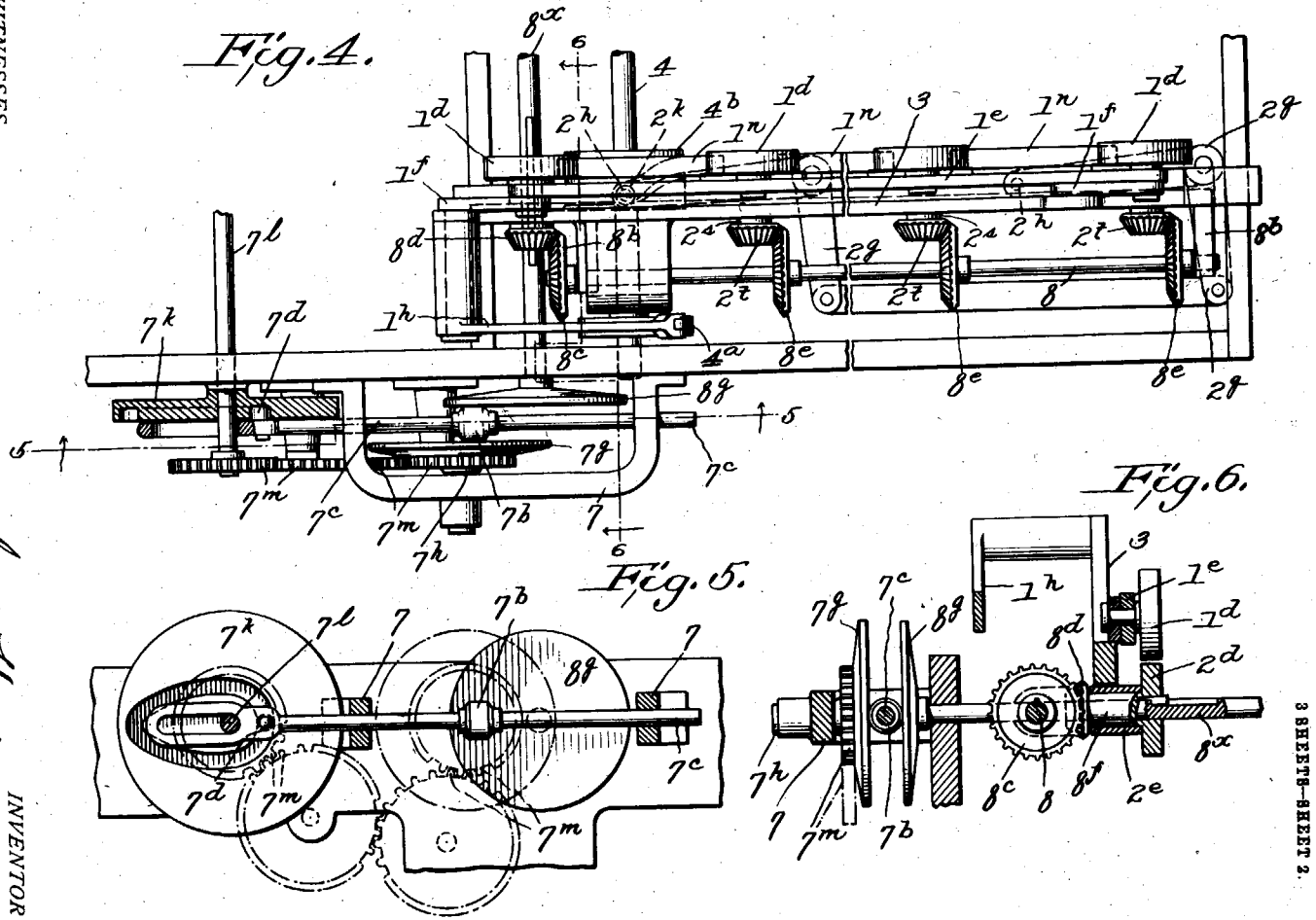
WITNESSES
Alvin H. Hohns
James R. Mansfield.
INVENTOR
Carl Henderson
By: Alexander Dowell
Attorneys
COLUMBIA PLANOGRAPH CO., WASHINGTON, D. C.

C. HENDERSON.

SHEET DELIVERY MECHANISM FOR PRINTING PRESSES.

APPLICATION FILED SEPT. 15, 1911.

Reissued Dec. 5, 1911. 13,336.

3 SHEETS—SHEET 3.

WITNESSES

Alonzo W. Holmes

James R. Mansfield

INVENTOR

Carl Henderson

By: Wyanden & Sewell

Attorneys

COLUMBIA PLANOGRAPH CO., WASHINGTON, D. C.

UNITED STATES PATENT OFFICE.

CARL HENDERSON, OF OAK PARK, ILLINOIS, ASSIGNOR TO MIEHLE PRINTING PRESS AND MANUFACTURING COMPANY, OF CHICAGO, ILLINOIS, A CORPORATION OF ILLINOIS.

SHEET-DELIVERY MECHANISM FOR PRINTING-PRESSES.

13,336. Specification of Reissued Letters Patent. Reissued Dec. 5, 1911.

Original No. 994,675, dated June 6, 1911, Serial No. 560,871. Application for reissue filed September 15, 1911. Serial No. 649,590.

*To all whom it may concern:*

Be it known that I, CARL HENDERSON, a citizen of the United States, residing at Oak Park, in the county of Cook and State of Illinois, have invented certain new and useful Improvements in Sheet-Delivery Mechanism for Printing-Presses, of which the following is a specification.

This invention is an improvement in sheet delivery apparatus of the kind shown in my applications serially numbered 495,599 filed May 13, 1909 (Patent No. 973,428, October 18, 1910) and filed March 18, 1910, Serial No. 550,230 (Patent No. 974,062, October 25, 1910).

The object of the present invention is to enable the sheets to be delivered by mechanism of this kind at the desired point, without the necessity of employing any sheet stops, and also to enable endless carriers or tapes to be dispensed with, if desired.

The invention embodies novel means whereby the sheet forwarding devices may be driven at variable speed so as to receive a sheet from the press, or sheet forwarding devices, at the speed at which the sheet is advancing, and carry the sheet to the point of discharge, and in the interim may be slowed down so that when the sheet is released thereby it will drop in proper position upon the receiving table.

The invention also embodies novel means for forwarding the sheets without the use of endless carriers.

Figure 1:
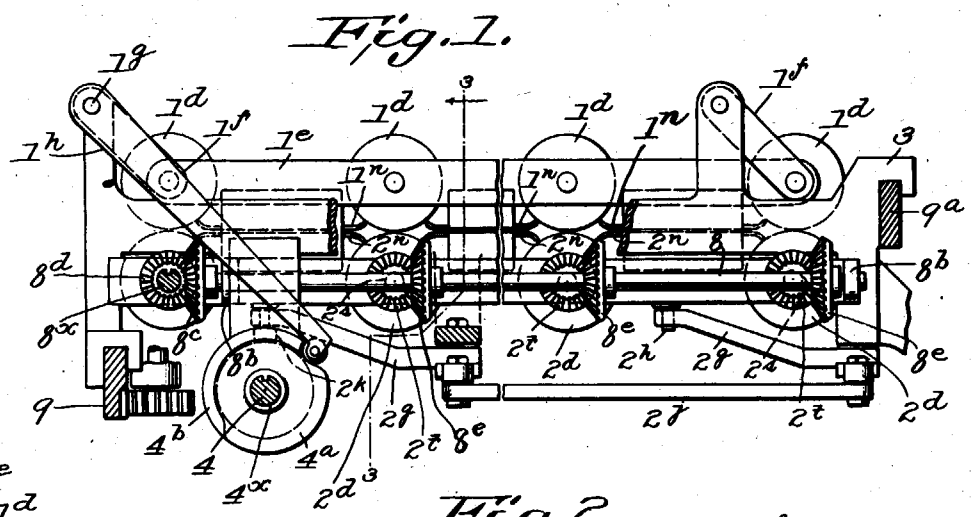
Figure 2:
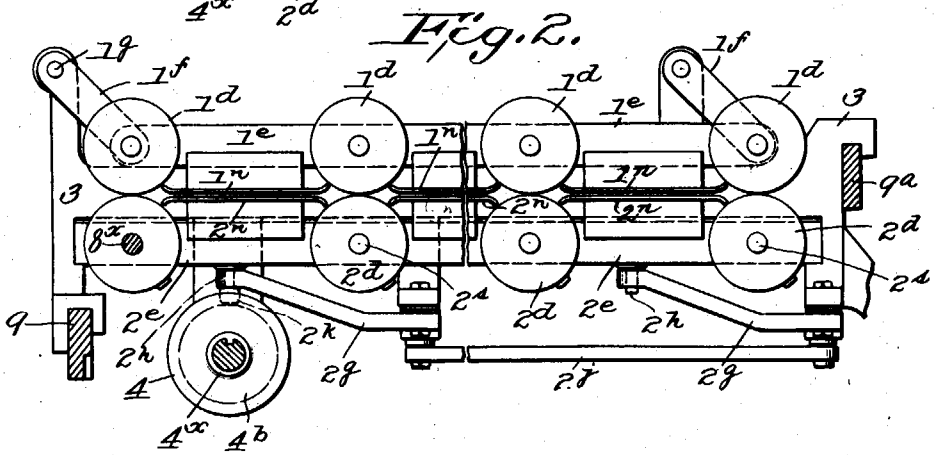
Figure 3:
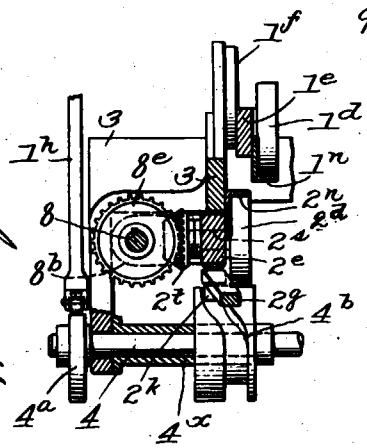
Figure 7:
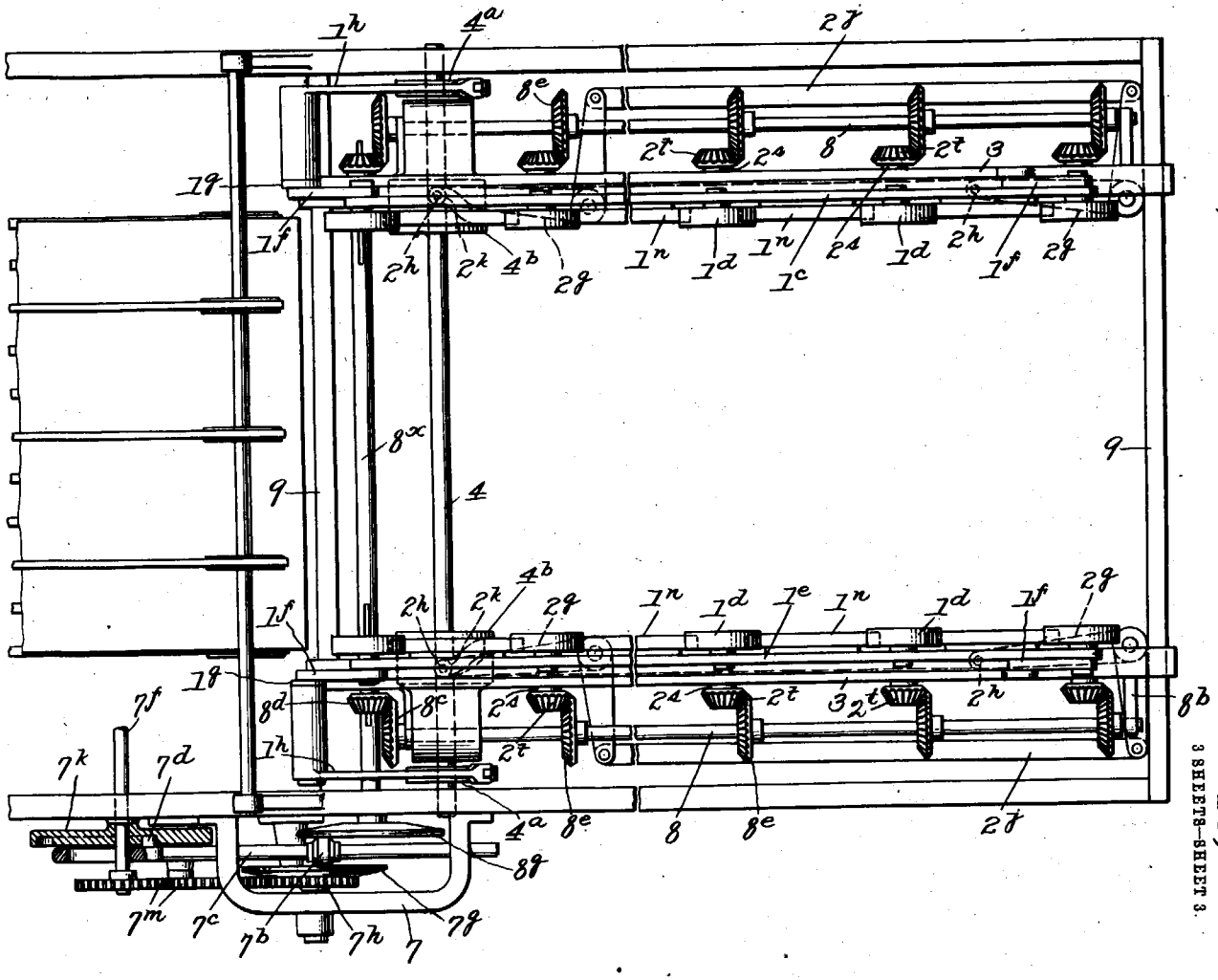

In said drawings—Figure 1 is a detail elevation of part of a sheet delivery mechanism, of the kind shown in my applications aforesaid, embodying the present invention and illustrating the novel sheet forwarding devices and means for operating same with variable or changeable speed. Fig. 2 is an inside face view of the sheet carrying devices shown in Fig. 1. Fig. 3 is a detail section on line 3—3, Fig. 1, looking in the direction of the arrows. Fig. 4 is a detail plan view of Fig. 1, and showing the frictional drive. Fig. 5 is a detail section on line 5—5, Fig. 4. Fig. 6 is a detail section on line 6—6 Fig. 4. Fig. 7 is a detail plan view of a complete delivery apparatus embodying the invention.

In its general construction and mode of operation in carrying a sheet to the dropping point the present delivery mechanism more nearly resembles the mechanism shown in my application filed March 18, 1910, above referred to,—and a complete delivery mechanism embodies two opposite sets of laterally adjustable devices slidably mounted upon transverse supports on the framework of the machine, at the delivery end thereof, as described in my aforesaid application.

Each set of devices comprises a frame 3 mounted upon transverse bars 9 and $9^a$, and on said frame is a vertical movable bar $1^e$ which may be connected therewith by means of links $1^f$, one of said links being attached to a rock-shaft $1^g$ to which is also attached an arm $1^h$, the lower end of which is adapted to engage a cam $4^a$ on a cross shaft 4; and at the proper time, cause bar $1^e$ to raise or lower vertically.

Mounted upon the frame 3, so as to be movable laterally thereof, is a second bar $2^e$ which lies parallel with bar $1^e$ and normally lies directly thereunder. This bar $2^e$ may be withdrawn outwardly from beneath bar $1^e$ by means of bell-crank arms $2^g$ pivoted upon the frame 3, and engaging pins $2^h$ on the under side of bar $2^e$, said bell-cranks being connected by a bar $2^j$; on one of said bell-cranks is a roller, or pin, $2^k$ which engages a groove in a race cam $4^b$, mounted upon a shaft 4 and connected to rotate with cam $4^a$. These parts are arranged and adapted to operate substantially as described in my application (filed March 18, 1910) aforesaid, Serial No. 550,230.

Upon the bar $1^e$ are mounted a series of rotatable rollers $1^d$ which project slightly below the plane of the bar; and upon the bar $2^e$ are mounted a similar series of rollers $2^d$ with which the rollers $1^d$ are adapted to coact in forwarding sheets of paper. One or both sets of these rollers should be driven; and the means for driving said rollers at variable speed is one feature of the invention. They may be driven in different ways; I have only shown means for driving the lower set of rollers $2^d$; and as shown the rollers $2^d$ are mounted upon short shafts $2^s$ journaled in the bar $2^e$ and having on their rear or outer ends small pinions $2^t$ which are adapted to mesh with larger pinions $8^e$ on a shaft 8 journaled in bearings or brackets $8^b$ attached to bar $2^e$; said shaft 8 being driven by means of a gear $8^c$ meshing with a gear $8^d$ slidably keyed on a transverse shaft $8^x$ which is journaled in the side frame of the press and may extend through suitable openings in the bars $2^e$, see Fig. 6. The gear $8^d$ may be attached to a sleeve $8^f$ slidably keyed to the shaft $8^e$ and passing through bar $2^e$; and the innermost roller $2^d$ may also be fastened to this sleeve $8^f$ as shown in Fig. 6. By this construction the gears $8^d$ and $8^c$, and pinions $2^t$ and $8^e$ will always be kept in mesh in all positions of bar $2^e$ and frame 3.

When shaft 8 is rotated all the rollers $2^d$ will be positively driven, and if the rollers $1^e$ are lowered into contact therewith it is obvious that if the margin of a sheet of paper is introduced between the first pair of rollers $2^d$, $1^d$, it will be forwarded by such pair of rollers to the next pair. As all the rollers $2^d$ are driven at the same peripheral speed, no tapes need be used to forward the sheets from one pair of rollers to the next; but if desired guards $1^n$ and $2^n$ may be arranged between the pairs of rollers, as shown in Figs. 1 and 2 to prevent the forward edge of a sheet being improperly displaced in passing from one pair of rollers to the next; the lower guards $2^n$ can be attached to and movable with bar $2^e$, and the upper sets of guards $1^n$ can be attached to and movable with bar $1^e$; said guards however are so arranged that they cannot bite the sheet.

The shaft $8^x$ may be driven by any suitable means so as to cause the rollers $2^d$, $1^d$ to forward sheets at the speed at which they are received from the press tapes. I prefer to drive the rollers at a varying speed, so that when a sheet of paper is first entered between the rollers $2^d$ $1^d$, it will be moved on by the rollers at the same speed at which it was brought from the press; but the speed of the rollers and sheet will be slowed down as the sheet nears the point of dropping so that as or when the sheet reaches the point of dropping and the rollers are separated the sheet can drop freely onto the receiving table. By reason of this slowing, or even stopping, of the rollers at the time of dropping the sheet, sheet arresting devices, or tail stops, such as described in my aforesaid applications may be dispensed with.

One means of driving the shaft $8^x$ at variable speed so as to operate rollers $1^d$, $2^d$, in the manner described, is indicated conventionally in the drawings as a variable friction drive. As shown shaft $8^x$ has a friction disk $8^g$ on its outer end, opposite another friction disk $7^g$ mounted on a stub-shaft $7^h$ in a bracket 7 attached to the main frame, and intermediate the disks $7^g$, $8^g$ is an intermediate friction gear $7^b$ rotatably mounted upon a slide bar $7^c$ supported and guided in openings in the bracket 7; and the outer end of this bar $7^c$ has a pin or roller $7^d$ engaging a race-cam $7^k$ on a shaft $7^1$ mounted on the frame, said cam $7^k$ being adapted to shift the friction gear $7^b$ transversely of the friction disks $8^g$, $7^g$.

The disk $7^g$ may be driven by any suitable means—at a predetermined ratio of speed to came $7^k$—and as indicated in the drawings disk $7^g$ is driven from shaft $7^1$ by a train of gears $7^m$. By properly adjusting the intermediate friction gear $7^b$, motion can be imparted to shaft $8^x$ at any desired speed up to the maximum of disk $7^g$.

The friction drive may be of any suitable kind; but the parts should be so proportioned and adjusted as to cause motion to be transmitted to the shaft $8^x$ in such time and manner, that the rollers $2^d$ will be rotating peripherally at the speed at which the sheet is received from the press, at the time said rollers receive the sheet, and will afterward be slowed down, or stopped, at the time the sheet is to be dropped:—at which time cam $4^a$ operates to lift bar $1^e$ and separate rollers $1^d$ from rollers $2^d$, and at substantially the same moment cam $4^b$ operates to move bar $2^e$ outward and thereby withdraw the rollers $2^d$ and guards $2^n$ from beneath the margins of the sheet, which can then freely drop onto the table below, as described in my aforesaid applications.

It will be understood that in the complete delivery there are two frames 3, and sets of rollers arranged at opposite sides of the path of the sheet, as it issues from the press, and that the outer margins of the sheet are engaged and held by and between the opposite sets of rollers, which grasp its outer margins and carry it to the point of deposit; and at that point the rollers are separated and the lower rollers retracted from beneath the margins of the sheet to permit it to drop. It will be observed that in this invention I can dispense with any tapes for carrying the sheet, such as described in my aforesaid applications.

The operations of forwarding and dropping a sheet are performed substantially as described in my aforesaid applications;-but in the present case instead of arresting the sheet by means of tail stops I preferably stop the sheet by slowing down the speed of the rollers $2^d$; and thereafter accelerate the speed of the rollers to that of the press tapes before the next sheet is entered between said rollers. The rollers $1^d$, $2^d$, however, could be continuously driven at the same speed, and used with a tail stop, and I therefore do not wish to wholly restrict the present invention to means for variably driving these rollers,—as I consider it includes the use of positively driven rollers forwarding a sheet to the point of deposit as well as means for retarding and arresting the movement of such rollers before the release of the sheet.

Having described my invention what I claim is:

1. In a sheet delivery apparatus for printing presses the combination of an adjusting support, a set of rollers thereon, an opposed horizontally movable set of rollers thereon, means for positively driving one set of rollers, means for varying the speed of the driven rollers so as to slow down the sheet at the point of delivery, and means for withdrawing the lower set of rollers from beneath the slowed sheet to permit it to drop.

2. In a sheet delivery apparatus for printing presses the combination of opposite adjustable supports, a vertically movable set of rollers thereon, an opposed horizontally movable set of rollers thereon, means for positively driving the latter rollers, means for varying the speed of the driven rollers so as to slow down the sheet at the point of delivery, and means for withdrawing the lower set of rollers from beneath the slowed sheet to permit it to drop.

3. In a sheet delivery apparatus, the combination of opposite sets of sheet engaging devices adapted to grasp the side margins of a sheet and transfer same to the dropping point; with means for similarly varying the speed of the said devices so as to cause them to gradually slow down the sheet before it reaches the point of dropping, and means for separating the devices to release the sheet at the dropping point.

4. In a sheet delivery apparatus, the combination of opposite sheet engaging devices adapted to grasp the side margins of a sheet, means for driving said devices to cause them to forward the sheet edgewise, means for similarly varying the speed of said devices so as to gradually slow down the sheet after it is taken by said devices and before it reaches the point of dropping, and means for separating said devices to drop the sheet at the proper point.

5. In a sheet delivery apparatus for printing presses the combination of opposite sets of co-acting rollers each set adapted to engage the side margins of a sheet between them and forward same edgewise, means for positively driving some of the rollers in each set to forward the sheet, means for varying the speed of the rollers to slow the sheet, and means for causing the sets of rollers to simultaneously release the sheet where it is to be dropped.

6. In a sheet delivery apparatus for printing presses the combination of a plurality of opposite pairs of rollers adapted to engage the side margins of a sheet and forward the same edgewise, means for positively driving some of the rollers to cause them to forward the sheet, means for varying the speed of the rollers to slow the sheet, and means for separating the rollers to release the sheet at the point of dropping same.

7. In a sheet delivery apparatus for printing presses the combination of opposite sets of sheet forwarding devices each composed of a plurality of pairs of rollers, and respectively adapted to grasp the opposite side margins of a sheet between them and forward the same edgewise; means for driving one roller in every pair in each set positively to cause them to forward the sheet, and means for simultaneously separating the rollers in the several pairs to release the sheet at the dropping point.

8. In a sheet delivery apparatus for printing presses the combination of opposite sets of sheet forwarding devices each composed of a plurality of pairs of rollers adapted to grasp the side margins of a sheet between them and forward the same edgewise; means for positively driving the lower rollers in each pair, and means for retracting the lower rollers to drop the sheet at the desired point.

9. In a sheet delivery apparatus for printing presses the combination of a pair of adjustable supports, a set of rollers on each support, an opposed horizontally movable set of rollers mounted on each support; means for positively driving all the rollers in one set on each support, and means for withdrawing the lower sets of rollers from beneath the sheet to permit it to drop.

10. In a sheet delivery apparatus for printing presses the combination of opposite adjustable supports, a vertically movable set of rollers on each support, an opposed horizontally movable set of rollers on each support; means for positively driving all the rollers in one set on each support, and means for withdrawing the lower sets of rollers from beneath the sheet to permit it to drop.

11. In a sheet delivery apparatus, the combination of opposite sets of pairs of rollers adapted to engage the margins of a sheet to forward same, and means for positively driving some of the rollers in each set to forward the sheet edgewise; with devices intermediate adjacent pairs of rollers for directing sheets from one pair of rollers to the next, and means for separating the rollers in each pair to release the sheet where it is to be dropped.

12. In a sheet delivery apparatus for printing presses the combination of opposite sets of pairs of rollers adapted to engage the side margins of a sheet, means for positively driving one of the rollers in each pair to cause them to forward the sheet edgewise; stationary devices between adjacent pairs of rollers for directing sheets from one pair of rollers to the next, and means for separating the rollers in each pair to release the sheet at the point of dropping same.

13. In a sheet delivery apparatus for printing presses the combination of opposite sets of pairs of rollers adapted to engage the opposite side margins of a sheet; means for positively driving one roller in each pair in order to forward the sheet edgewise; means for varying the speed of the rollers so as to slow down the sheet before it reaches the point of dropping, and means for causing the rollers to release the sheet at the dropping point.

14. In a sheet delivery apparatus for printing presses the combination of a plurality of opposite sets of pairs of rollers adapted to engage the side margins of a sheet, means for positively driving some of the rollers to cause them to forward a sheet edgewise; means for varying the speed of the rollers so as to slow down the sheet after it is received and before it reaches the dropping point, and means for separating the rollers to drop the slowed sheet.

15. In a sheet delivery apparatus for printing presses the combination of opposite sets of pairs of rollers, the pairs in the sets being adapted to grasp the side margins of a sheet between them; means for driving one roller in each pair positively, means for slowing down the driven rollers to retard the sheet at the point of dropping, and means for separating the rollers to release the retarded sheet.

16. In a sheet delivery apparatus for printing presses the combination of opposite sets of upper and lower rollers adapted to grasp the side margins of a sheet between them and forward it edgewise; means for driving the lower rollers in each series positively; means for varying the speed of the driven rollers so as to slow the sheet as it reaches the dropping point, and means for separating the rollers to release the slowed sheet at the dropping point.

In testimony that I claim the foregoing as my own, I affix my signature in presence of two witnesses.

CARL HENDERSON.

Witnesses:
C. I. MANSEN,
C. D. GIBBS.

Copies of this patent may be obtained for five cents each, by addressing the "Commissioner of Patents, Washington, D. C."